United States Patent [19]

Stubbs

[11] Patent Number: 4,592,203

[45] Date of Patent: Jun. 3, 1986

[54] HYDRO-DYNAMIC TRANSMISSIONS

[75] Inventor: Peter W. R. Stubbs, Hampton Magna, United Kingdom

[73] Assignee: BL Cars Limited, London, England

[21] Appl. No.: 442,741

[22] Filed: Nov. 18, 1982

[30] Foreign Application Priority Data

Nov. 24, 1981 [GB] United Kingdom ............... 8135391

[51] Int. Cl.$^4$ .............................................. F16D 33/06
[52] U.S. Cl. ...................................... 60/358; 192/3.3
[58] Field of Search ................. 60/337, 347, 352, 364, 60/358, 330, 357, 348; 192/3.3, 3.29, 3.28, 3.21, 58 B, 61

[56] References Cited

U.S. PATENT DOCUMENTS

| | | | |
|---|---|---|---|
| 1,748,436 | 2/1930 | Arkin | 192/61 |
| 1,938,357 | 12/1933 | Sinclair | 60/358 |
| 2,358,058 | 9/1944 | Crites | 192/61 |
| 2,363,983 | 11/1944 | Miller | 60/358 X |
| 2,999,361 | 9/1961 | Zierick | 60/358 X |
| 3,012,403 | 12/1961 | Westcott, Jr. | 91/432 X |
| 3,150,492 | 9/1964 | Gsching | 60/352 |
| 4,091,901 | 5/1978 | F'Geppert | 192/61 |

FOREIGN PATENT DOCUMENTS 681594 10/1952 United Kingdom ............... 60/352

*Primary Examiner*—Edward K. Look
*Attorney, Agent, or Firm*—Hayes, Davis & Soloway

[57] ABSTRACT

A torque converter has a positive displacement pump (15,16) for charging and for circulating fluid for cooling purposes, which is driven at a speed equal to the difference in speed between the input and the output of the torque converter. The torque converter can be locked-up by stalling the pump flow by means of a valve (36).

7 Claims, 1 Drawing Figure

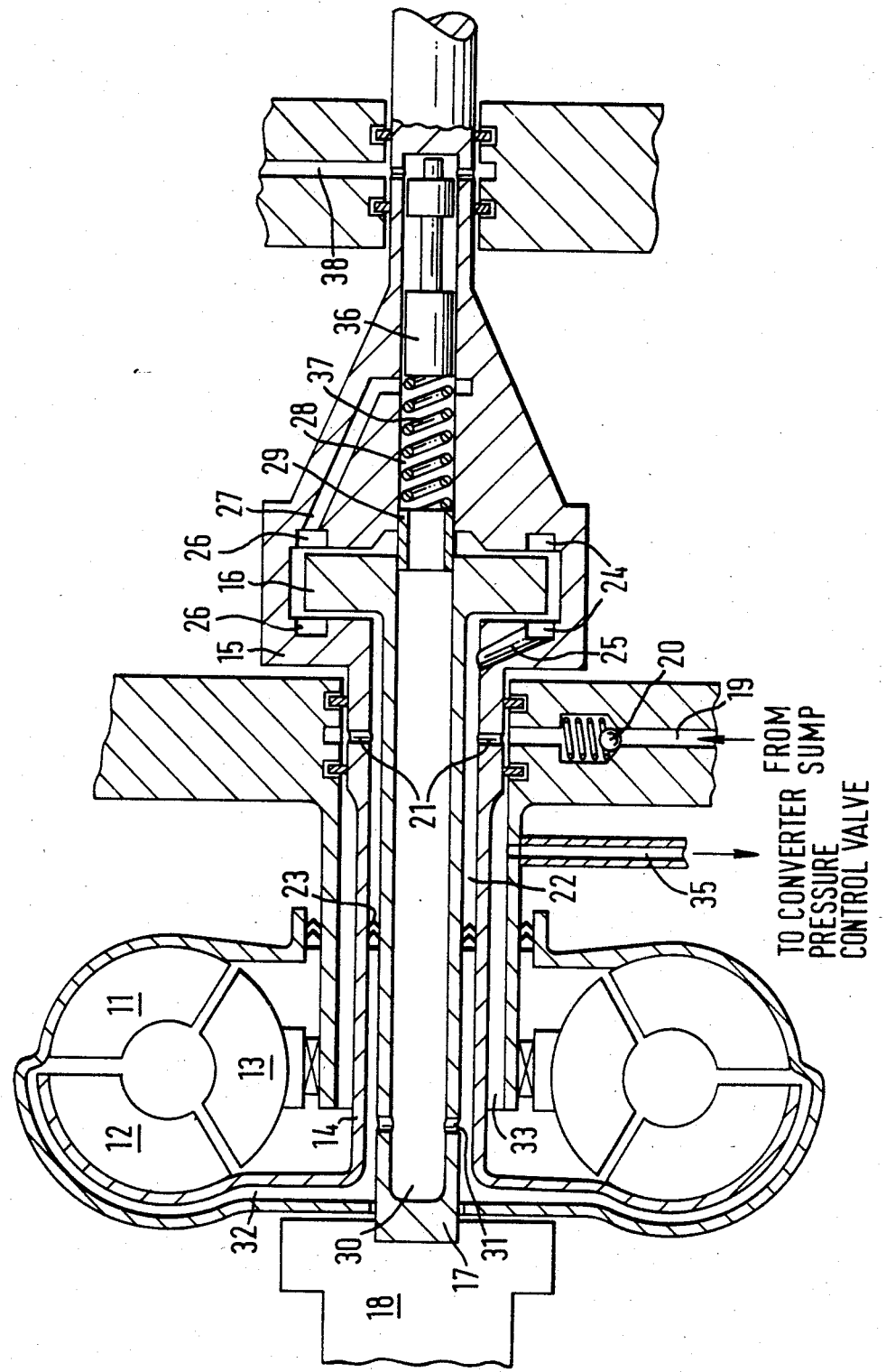

HYDRO-DYNAMIC TRANSMISSIONS

This invention relates to hydro-dynamic transmissions, for example torque converters and fluid couplings, wherein a driving part and a driven part are moveable relative to one another and transmit motion from one to the other by means of momentum imparted to fluid.

Such transmissions commonly have a pump driven at the same speed as the input and used to charge the torque converter, for example, to maintain a moderate pressure in it to suppress cavitation, and to circulate fluid through the device for cooling purposes. The generation of heat in such devices is not closely related to the input speed however, and thus the fluid flow rate is not well matched to the cooling requirement, which leads to parasitic energy losses.

The invention provides a hydro-dynamic transmission including a positive displacement pump connected to the driving part and to the driven part in such manner as to have an operating speed proportional to the relative speed of the driving part to the driven part.

It is known in order to reduce energy losses in the transmission, to lock-up the driving part and the driven part when the relative speed would be low. Such known arrangements entail the provision of an additional clutch member however, resulting in increased complication and cost.

According to a preferred form of the invention, means are provided for restricting flow through the pump, whereby to restrict relative movement of the driving and driven parts. Clearly if, as may be preferred, the pump flow is substantially stalled, relative rotation of the driving and driven parts is substantially prevented.

An embodiment of the invention will now be described with reference to the accompanying drawing, which shows diagrammetically in cross-section, a torque converter constituting a hydro-dynamic transmission in accordance with the invention.

As is conventional, the torque converter comprises three elements: a pump element 11, which constitutes a driving element, a turbine element 12, which constitutes a driven element, and a reactor element 13 which deflects flow from the pump element to enhance its effect on the turbine.

A tubular shaft 14 is connected for rotation with the turbine 12 and with the outer element 15 of a positive displacement vane pump. The inner element 16 of the positive displacement pump is driven by a tubular shaft 17 which is carried coaxially within shaft 14 and which is driven by the output shaft 18 of an engine (not shown).

Oil flow to the pump from a sump (not shown) is via a passage 19 containing a non-return valve 20, through holes 21 in shaft 14 into an annular space 22 between shafts 14 and 17 which is sealed from the converter by a seal 23, and thence to the pump inlet ports 24 by way of a passage 25. Flow from the pump passes from outlet ports 26 and flows by way of passage 27 to bore 28 and then by way of a transfer tube 29 into the bore 30 of the shaft 17. From there the oil passes through transfer holes 31 into the torque converter inlet 32 where it is circulated in a conventional manner and finally expelled to return to the sump by way of the annular space 33, a tube 35 and a pressure control valve (not shown).

Flow from the pump can be restricted or substantially blocked by a valve member 36 which is normally held in an open position by a spring 37 but which can be selectively urged against the spring to close the valve by means of hydraulic pressure in fluid introduced through a passage 38.

Valve 36, which is located downstream of the positive displacement pump but upstream of the torque converter, can be used to substantially block flow from the pump thus stalling it to substantially prevent relative rotation of its inner and outer parts.

With valve 36 open, the transmission operates with varying amounts of slip between the turbine element 12 and the pump element 11, relative rotation of the two elements causing the positive displacement pump to operate, drawing fluid from the sump to maintain the torque converter charged with fluid and to effect a flow of fluid for cooling purposes. When it is desired to lock-up the torque converter so that drive can be transmitted directly through it without slip, valve 36 is closed to lock the outer and inner elements 15, 16, and hence the turbine element and the pump element together.

It will be seen that the illustrated embodiment provides an advantageous arrangement wherein then the torque converter is operating with slip the flow of cooling fluid is better matched to requirements than in the case of a conventional transmission in which the pump is driven at input speed.

Moreover the arrangement provides a convenient means for locking up the torque converter without resorting to the provision of a friction clutch.

It will be clear that numerous modifications of the illustrated arrangement are possible within the scope of the invention. For example other types of hydro-dynamic transmission could be employed, such as a fluid coupling. Again, it may be preferred not to rely exclusively on the positive displacement pump for circulating cooling fluid and charging the torque converter, a small auxiliary pump being employed in addition.

I claim:

1. A hydro-dynamic transmission including a driving part and a driven part, which parts are moveable relative to one another and transmit motion from one to the other by means of momentum imparted to fluid, including a positive displacement pump, said pump being operable to charge said driving part and said driven part with fluid and to circulate fluid in said hydrodynamic transmission for cooling purposes, and said pump being connected to said driving part and to said driven part in such manner as to have an operating speed proportional to the speed of said driving part relative to said driven part to match said cooling to heat generated, and including means for restricting flow through said pump operable to substantially stall said pump whereby to substantially prevent relative rotation of said driving part and said driven part.

2. A transmission as claimed in claim 1, wherein said flow restriction means is downstream of said pump.

3. A transmission as claimed in claim 1, wherein said flow restriction means is upstream of said driving part and said driven part.

4. A transmission as claimed in claim 1, wherein said pump operates by relative movement of two elements, and a first of said elements is connected directly for movement with said driving part and the second of said elements is connected directly for movement with said driven part.

5. A transmission as claimed in claim 1, wherein said tranmission comprises a fluid coupling.

6. A transmission as claimed in claim 1, wherein said transmission comprises a torque converter and wherein said driving part is a pump element of the torque converter and said driven part is a turbine element of the torque converter.

7. A transmission as claimed in claim 1, wherein said positive displacement pump draws fluid from a sump, and including a non-return valve between said sump and said pump.

* * * * *